United States Patent [19]

Kim et al.

[11] Patent Number: 5,604,916
[45] Date of Patent: Feb. 18, 1997

[54] CONTROLLING DEVICE FOR SWITCHING SERIAL COMMUNICATION PORT AND LIGHT COMMUNICATION PORT AND ITS DRIVING METHOD

[75] Inventors: Man S. Kim, Seoul; Kwan H. Lee, Kwacheon, both of Rep. of Korea

[73] Assignee: Samsung Electronics Co., Ltd., Kyungki-do, Rep. of Korea

[21] Appl. No.: 302,251

[22] Filed: Sep. 8, 1994

[30] Foreign Application Priority Data

Sep. 8, 1993 [KR] Rep. of Korea .................. 93-18038

[51] Int. Cl.⁶ .................. G06F 9/00; G06F 13/00; G06F 13/10
[52] U.S. Cl. .................. 395/822; 395/750
[58] Field of Search .................. 395/750, 856, 395/879, 822; 371/15.1

[56] References Cited

U.S. PATENT DOCUMENTS

| | | | |
|---|---|---|---|
| 4,530,069 | 7/1985 | Desrochers | 395/822 |
| 4,747,041 | 5/1988 | Engel et al. | 364/200 |
| 4,937,781 | 6/1990 | Lee et al. | 364/900 |
| 4,964,124 | 10/1990 | Burnett | 371/15.1 |
| 5,005,151 | 4/1991 | Kurkowski | 364/900 |
| 5,163,124 | 11/1992 | Yabe et al. | 395/750 |
| 5,276,443 | 1/1994 | Gates et al. | 395/822 |
| 5,297,141 | 3/1994 | Marum | 370/85.13 |
| 5,416,909 | 5/1995 | Long et al. | 395/856 |
| 5,444,856 | 8/1995 | Bowers et al. | 395/200.1 |
| 5,486,726 | 1/1996 | Kim et al. | 307/120 |

*Primary Examiner*—Thomas C. Lee
*Assistant Examiner*—D. Dinh
*Attorney, Agent, or Firm*—Sughrue, Mion, Zinn, Macpeak & Seas

[57] ABSTRACT

A switch controlling device for a serial communication port and a light communication port having an asynchronous communication part, a switch, a micro-controller, multiplexers, an EIA driver, and a light signal input/output part. The switch controlling device for the serial communication port and the light communication port is driven by a user selecting the serial communication port or the light communication port, after both the serial communication port and light communication port have been installed in a computer system.

6 Claims, 4 Drawing Sheets

CONTROLLING DEVICE FOR SWITCHING SERIAL COMMUNICATION PORT AND LIGHT COMMUNICATION PORT AND ITS DRIVING METHOD

BACKGROUND OF THE INVENTION

1. Field of the Invention

The present invention relates to a switch controlling device for a serial communication port and a light communication port and a driving method for the switch controlling device. More particularly, it relates to the above switch controlling device and its driving method by which a user can select either the serial communication port or light communication port, after both the series communication port and light communication port have been installed in a computer system.

2. Description of the Prior Art

Generally, a computer includes a communication port to transmit configuration information to, and/or receive configuration information from, a configuration storage device. The communication port is referred to as a serial communication port, since the transmission process of data is performed in series.

The following description relates to a conventional serial communication port.

As shown in FIG. 1, which illustrates a circuit diagram of a conventional serial communication port, the serial communication port includes an asynchronous communication part 11 having input and output terminals connected to a system bus, an EIA driver 12 having input and output terminals connected to the asynchronous communication part 11, and a D-type connector 13 connected to the EIA driver 12.

Intel chip 8250, which is an asynchronous communication element (ACE), is primarily used as the asynchronous communication part 11.

The operation of the conventional serial communication port having the above structure is as follows.

After an input/output address of the asynchronous communication part 11 (main: 3F8H and auxiliary: 2F8H-2FFH) is selected via a system bus, an information signal containing a controlling command or data is inputted to start the operation of the asynchronous communication part 11.

Registers of the asynchronous communication part 11 selected by the address produced via the system bus are shown in Table 1.

TABLE 1

| I/O Address | | | DLAB |
|---|---|---|---|
| Main | Auxiliary | Selection of Registers | Condition |
| 3F8 | 2F8 | TX Buffer | DLAB = 0 (Write) |
| 3F8 | 2F8 | RX Buffer | DLAB = 0 (Read) |
| 3F8 | 2F8 | Divisor Latch LSB | DLAB = 1 |
| 3F9 | 2F9 | Divisor Latch MSB | DLAB = 1 |
| 3F9 | 2F9 | Interrupt Enable Register | |
| 3FA | 2FA | Interrupt Confirm Register | |
| 3FB | 2FB | Line Control Register | |
| 3FC | 2FC | Modem Control Register | |
| 3FD | 2FD | Line Condition Register | |
| 3FE | 2FE | Modem Condition Register | |

The asynchronous communication part 11 either outputs a controlling signal and the like for controlling lines and a MODEM to the D-type connector 13 via the EIA driver 12, according to information signals stored in the registers, or transmits information signals, such as the conditions of lines or a MODEM inputted via the D-type connector 13 and EIA driver 12.

Accordingly, a user can perform a communication through a program controlling the registers of the asynchronous communication part 11.

In such a conventional serial communication port, however, the user has to directly connect the D-type connector 13 of the computer to exterior peripheral equipment by means of a cable connector.

In order to eliminate this effort, a technique of using a light communication port that can perform serial communication by means of a light signal is disclosed in Korean Utility Model Application No. 1993-3036 (filing date: Mar. 3, 1993) entitled "Light Connection Interface of a Portable Computer and a Docking Station".

The following description relates to a conventional light communication port.

FIG. 2 illustrates a conventional light communication port which includes an asynchronous communication part 21 having input and output terminals connected to a system bus, a light signal input/output part 22 having input and output terminals connected to the asynchronous communication part 21, and a docking station 23 connected to the light signal input/output part 22 via a light channel.

The operation of the conventional communication port having the above structure is as follows.

If an information signal relating to a controlling command or data is inputted after an input/output address of the asynchronous communication part 21 (3F8H-3FFH and 2F8H-2FFH) is selected, the operation of the asynchronous communication part 21 starts.

The asynchronous communication part 21 either outputs a control signal controlling lines or a MODEM to the light signal input/output part 22, according to an information signal stored in the registers of the above Table 1, or transmits to a system bus an information signal about the conditions of the lines or the MODEM inputted via the light signal input/output part 22.

The light signal input/output part 22 converts an electrical signal inputted from the asynchronous communication part 21 into a light signal, and transmits the signal to the docking station 23 via a separate light channel. The light signal input/output part 22 also converts the light signal inputted via the separate light channel from the docking station 23 into an electrical signal to transmit this signal to the asynchronous communication part 21.

Accordingly, the user may perform a communicating operation through the programs controlling the registers of the asynchronous communication part 21.

In the conventional series communication port and light communication port, however, input/output addresses are set to allow the use of only one communication port in a computer system, and both the series communication port and the light communication port cannot be installed independently in a computer system.

SUMMARY OF THE INVENTION

It is an object of the present invention to provide a switch controlling device for a series communication port and a light communication port and a driving method for the switch controlling device by which a user can select one of the series communication port and light communication port, after both the series communication port and light communication port have been installed in a computer system.

To achieve this object, the present invention comprises:

An asynchronous communication part for producing a control signal for controlling lines or a modem connected to exterior peripheral equipment or transmitting an information signal such as the conditions of lines or a modem inputted from the exterior peripheral equipment, if an information signal about a control command or data is inputted;

a switch producing a switch signal to determine one port between the light communication port and the serial communication port;

a micro-controller outputting a control signal for determining a transmit channel of the serial communication port, cutting off power of the light communication port, provided the light communication port is not determined by the switch signal inputted from the switching switch, and outputting a control signal for determining a transmit channel of the light communication port, applying power to the light communication port, provided the light communication port is determined;

multiplexers whose transmit channel is selected by a control signal inputted from the micro-controller;

an EIA driver electrically connected to the asynchronous communication part via the transmit channel of the multiplexers; and a light signal input/output part electrically connected to the asynchronous communication part via the transmit channel of the multiplexers and to which power is applied or cut off by a control signal of the micro-controlling means.

As another aspect of this invention, the present invention provides a method for driving a switch controlling device of a serial communication port and a light communication port comprising the steps of:

reading a switch signal when power is applied;

determining from the read switch signal whether the light communication port is predetermined;

predetermining a transmit channel of the serial communication port simultaneously with cutting off power of the light communication port when the light communication port is not predetermined; and predetermining a transmit channel of the light communication port simultaneously with applying power to the light communication port when the light communication port is predetermined.

BRIEF DESCRIPTION OF THE DRAWINGS

The above objects, features and advantages of the invention are believed to be readily apparent from the following description of a preferred embodiment of the best mode of carrying out the invention when taken in conjunction with the drawings, wherein.

DETAILED DESCRIPTION OF THE PREFERRED EMBODIMENTS

The present invention will now be described in detail with reference to the accompanying drawings.

Figure 1:
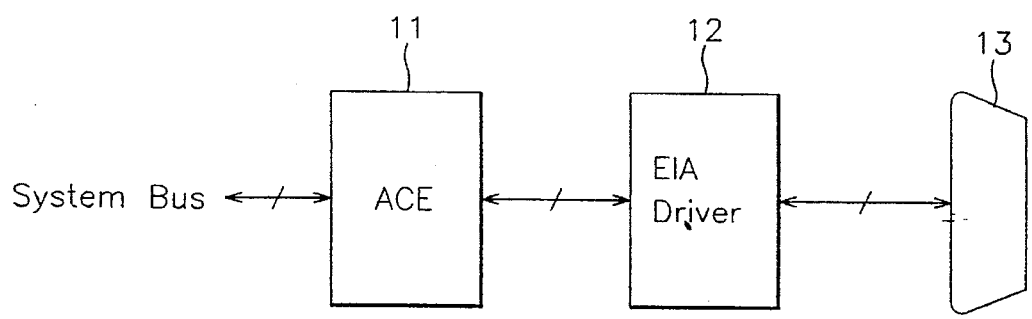
FIG. 1 is a circuit diagram of a conventional serial communication port.
Figure 2:
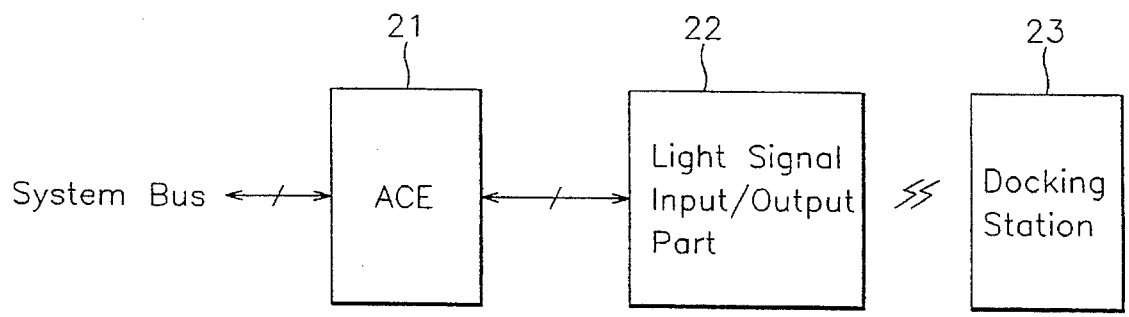
FIG. 2 is a circuit diagram of a conventional light communication port.
Figure 3:
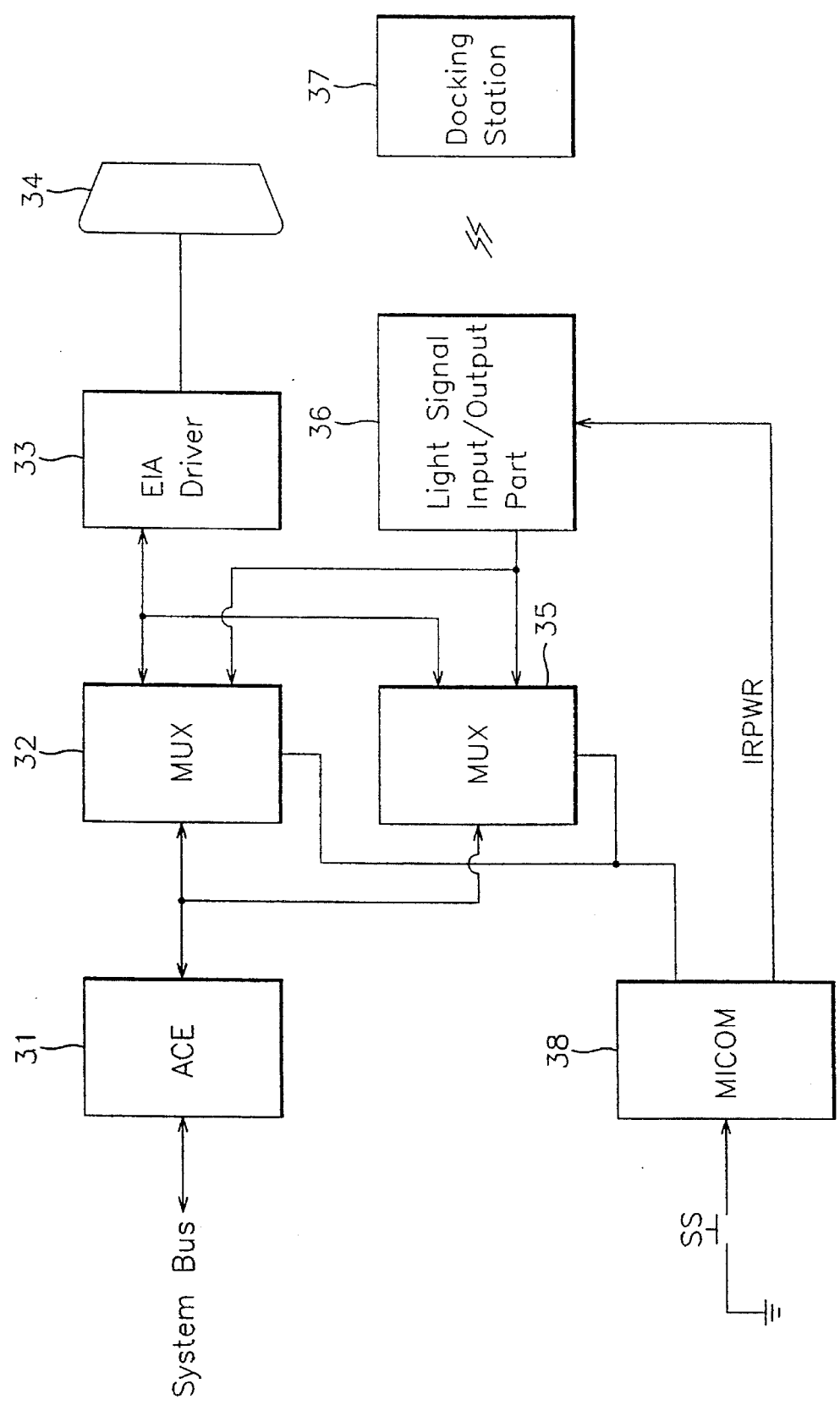
FIG. 3 is a circuit diagram of a switch controlling device of a serial communication port and a light communication port in accordance with a preferred embodiment of this invention.

FIG. 3 is a circuit diagram of a switch controlling device of a serial communication port and a light communication port in accordance with a preferred embodiment of this invention.

As shown in FIG. 3, a switch controlling device of a serial communication port and a light communication port according to the inventive preferred embodiment, includes: a micro-controller 38 having an input terminal connected to a switch SS; an asynchronous communication part 31 having input and output terminals connected to a system bus; a multiplexer 32 and a standby multiplexer 35 having channel selection input terminals respectively connected to an output terminal of the micro-controller 38 and input and output terminals connected to an asynchronous communication part 31; an EIA driver 33 having input and output terminals connected to the multiplexer and standby multiplexer 35; a D-type connector 34 connected to the EIA driver 33; a light signal input/output part 36 having an input terminal connected to an output terminal IRPWR of the micro-controller 38 and having input and output terminals connected to the multiplexer 32 and the standby multiplexer 35; and a docking station 37 connected to the light signal input/output part 36.

The preferred embodiment of the present invention uses Intel chip 8250 as the asynchronous communication part 31, but its technical scope is not limited thereto.

Figure 4:
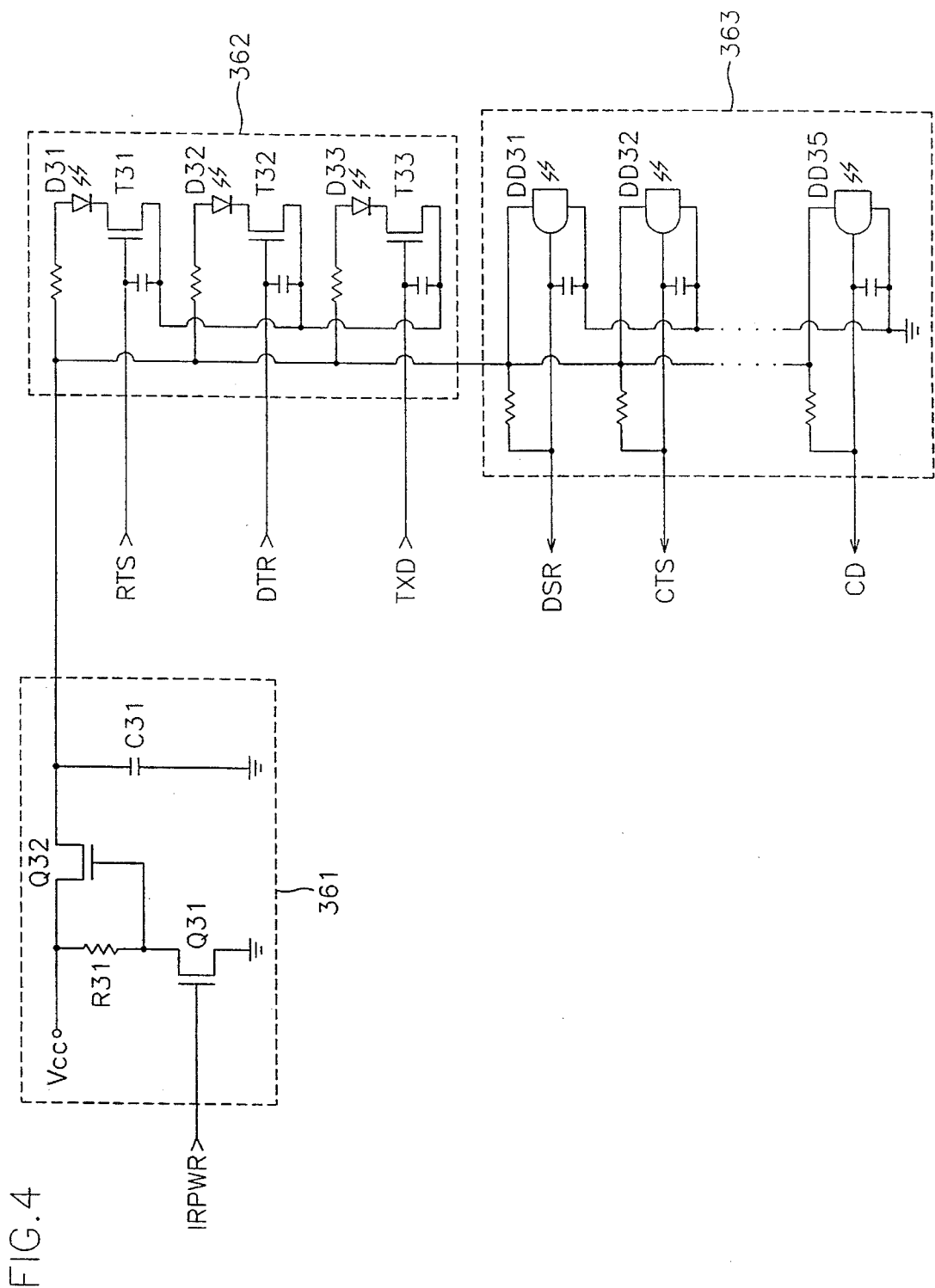
FIG. 4 is a detailed circuit diagram of a light signal input/output part of the switch controlling device of the series communication port and light communication port in accordance with the preferred embodiment of this invention.

FIG. 4 is a detailed circuit diagram of the light signal input/output part of the switch controlling device of the serial communication port and the light communication port in accordance with the preferred embodiment of this invention.

As shown in FIG. 4, the light signal input/output part 36 of the switch controlling device includes a power driving part 361 having an input terminal connected to the output terminal IRPWR of the micro-controller 38; a light signal output part 362 having a power input terminal connected to an output terminal of the power driving part 361; and a light signal input part 363. The power driving part 361 includes a field effect transistor Q31 having a gate terminal connected to the output terminal IRPWR of the micro-controller 38, and having a source terminal grounded; a resistance R31 connected between power Vcc and the field effect transistor Q31; a field effect transistor Q32 having a drain terminal connected to power Vcc and having a gate terminal connected to the drain terminal of the field effect transistor; and a capacitor C31 connected between a source terminal of the field effect transistor Q32 and ground.

The light signal output part 362 and the light signal input part 363 are the same as those disclosed in Korean Utility Model Application No. 1993-3036, and a description of them is omitted.

Figure 5:
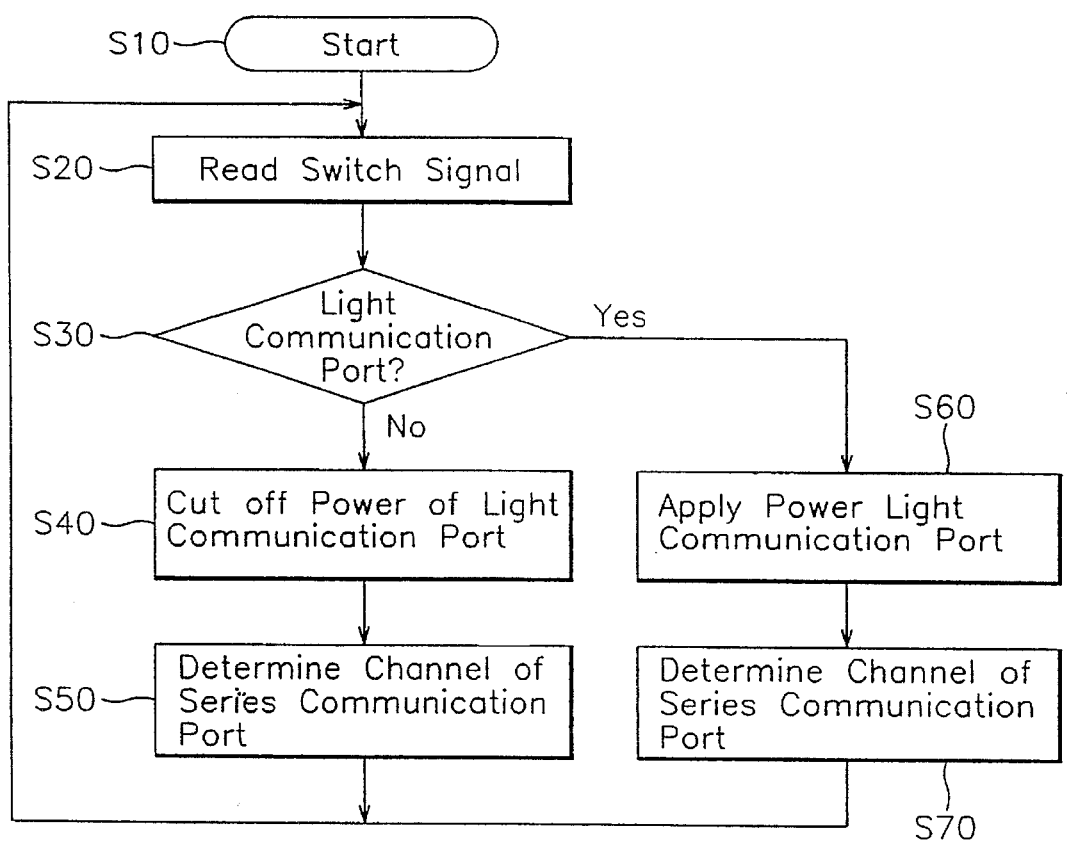
FIG. 5 is a flowchart of a method for driving the switch controlling device of the series communication port and light communication port in accordance with a preferred embodiment of this invention.

FIG. 5 is a flowchart of a method for driving the switch controlling device of the serial communication port and light communication port in accordance with a preferred embodiment of this invention.

As shown in FIG. 5, the method for driving the switch controlling device includes the steps of: starting operation upon applying power (S10); reading a switch signal (S20); determining from the read switch signal whether the light communication port is predetermined (S30); cutting off power of the light communication port provided the light communication port is not predetermined (S40); determining a transmit channel of the serial communication port (S50); applying power to the light communication port provided the light communication port is predetermined (S60); and determining a transmit channel of the light communication port.

The following description relates to the inventive switch controlling device of the serial communication port and the light communication port and its driving method.

When the power is applied, the method for driving the switch controlling device stored in an internal memory of the micro-controller 38 is performed by the micro-controller 38.

When the operation starts, the micro-controller 38 reads a switch signal produced by the switch SS which has been turned on or turned off by the user. The micro-controller determines from the switch signal which one of the light communication port and the serial communication port is to be used.

When the light communication port is to be used, the micro-controller 38 outputs a low-level output signal IRPWR to the power driving part 361 of the light signal input/output part 36, and power is applied to the light signal output part 362 and light signal input part 363.

In this instance, when the low-level output signal IRPWR is inputted from the micro-controller 38, the transistor Q32 is turned on, as the transistor Q31 of the power driving part 361 of the light signal input/output part 36 is turned off. When the transistor Q32 is turned on, the voltage Vcc is applied to the capacitor C31 via the transistor Q32, and a constant voltage signal is provided to the light signal output part 362 and the light signal input part 363.

The micro-controller 38 applies a channel selection signal to the multiplexer 32 and the standby multiplexer 35, and the asynchronous communication part 31 is electrically connected to the light signal input/output part 36 via the multiplexer 32 and the standby multiplexer 35.

In this manner, the constant voltage signal is inputted from the power driving part 361 of the light signal input/output part 36 to operate the light signal output part 362 and the light signal input part 363. The asynchronous communication part 31 and the light signal input/output part 36 attains a standby condition 25 for performing light signal transmission, provided that a data transmit channel is formed through the multiplexer 32 and the standby multiplexer 35.

At this point, if an information signal containing a control command or data is inputted after an input/output address (3F8H-3FFH, 2F8H-2FFH) of the asynchronous communication part 31 is selected, the operation of the asynchronous communication part 31 starts.

The asynchronous communication part 31 either outputs a control signal for controlling lines or a MODEM to the light signal input/output part 36 via the multiplexer 32 and the standby multiplexer 35, according to the information signal stored in the registers of Table 1, or transmits to the system bus an information signal about the conditions of lines or a MODEM inputted via the light signal input/output part 36.

If a high-level signal is produced through the multiplexers 32, 35 from the asynchronous communication part 31, field effect transistors T31 to T33 are turned on, and light emitting diodes D31 to D33 connected to drain terminals of the field effect transistors T31 to T33 are then turned on to produce a light signal. Accordingly, the light signal output part 362 of the light signal input/output part 36 converts the inputted electrical signal into a light signal and then outputs it to the docking station 37.

The light signal is inputted from the docking station 37 to operate corresponding light receiving elements DD31 to DD35, and a high-level signal is produced from the light receiving elements DD31 to DD35. Thus, the light signal input part 363 of the light signal input/output part 36 converts the inputted light signal into an electrical signal and transmits it to the asynchronous communication part 31 via the multiplexers 32, 35.

Accordingly, the user can perform a light communication operation via the programs controlling the registers of the asynchronous communication part 31.

If the user selects the serial communication port instead of the light communication port, the micro-controller 38 outputs a high-level output signal IRPWR to the power driving part 361 of the light signal input/output part 36 to cut off the power applied to the light signal output part 362 and light signal input part 363.

If the high-level output signal IRPWR is inputted from the micro-controller 38, the transistor Q31 of the power driving part 361 of the light signal input/output part 36 is turned on, and the transistor Q32 is turned off. If the transistor Q32 is turned off, the power is not applied to the light signal output part 362 and the light signal input part 363 to stop the operation of the light signal output part 362 and the light signal input part 363.

The micro-controller 38 outputs a channel selection signal to the multiplexer 342 and the standby multiplexer 35, and the asynchronous communication part 31 and EIA driver 33 are electrically connected to each other via the multiplexer 32 and the standby multiplexer 35.

In this manner, the light signal output part 362 and the light signal input part 363 of the light signal input/output part 36 do not function, and the asynchronous communication part 31 and the EIA driver 33 attain a standby condition for performing a serial data transmission, if a data transmit channel is formed through the multiplexer 32 and the standby multiplexer 35.

If an information signal containing a control command or data is inputted after an input/output address of the asynchronous communication part 31 (3F8H-3FFH, 2F8H-2FFH) is selected through the system bus, the operation of the asynchronous communication part 31 starts.

Accordingly, the user can perform the serial communication operation through the programs controlling the registers of the asynchronous communication part 31.

This embodiment uses the multiplexer 32 and the standby multiplexer 35 in order to make the data transmit channel switchable among the asynchronous communication part 31, EIA driver 33 and light signal input/output part 36. The standby multiplexer 35 may allow proper functioning of the system in the event that multiplexer 32 malfunctions, thus enhancing the reliability of the overall operation.

Additionally, the preferred embodiment of this invention is designed to automatically determine the serial communication port and the light communication port through the switch SS. The switch SS is installed on a part of the computer to which the docking station is connected, and the docking station is turned on or turned off mechanically by the docking station's being removed from or mounted on the computer. Thus, if the docking station is connected to the computer, the light communication port is automatically selected.

The present invention may provide the switch controlling device of the serial communication port and the light communication port and its driving method by which a user can select one of the serial communication port and light communication port, after both the serial communication port and light communication port have been installed in a computer system.

Such an effect of this invention may be used in all fields of the design, manufacture, sale and the like of computer communication ports.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A switch controlling device of a wired serial communication port and a light serial communication port comprising:

a single asynchronous communication part for executing one of producing a control signal for controlling lines or a modem, said lines or modem being connected to exterior peripheral equipment, and transmitting an information signal such as conditions of lines or modem inputted from the exterior peripheral equipment, wherein said execution is effected when an information signal containing a control command or data is inputted;

a switch for producing a switch signal which is used for selecting one of the light serial communication port and the wired serial communication port;

a micro-controlling means for outputting a control signal which causes selection of the wired serial communication port as a transmit channel and which de-activates the light serial communication port as a transmit channel by cutting off power to the light serial communication port when the light serial communication port is not selected by the switch signal produced by the switch, and for outputting a control signal which activates the light serial communication port as a transmit channel by applying power to the light serial communication port when the light communication serial port is selected by the switch signal;

at least one multiplexer for selecting one of the wired serial communication port and the light serial communication port as the transmit channel according to a control signal inputted from said micro-controlling means;

an EIA driver electrically connected to said asynchronous communication part via the transmit channel selected by said at least one multiplexer; and a light signal input/output part electrically connected to said asynchronous communication part via the transmit channel selected by said at least one multiplexer and to which power is applied or cut off according to the control signal outputted by said micro-controlling means.

2. The switch controlling device according to claim 1, wherein said switch is turned on or turned off by a user to allow the user to select one of the light serial communication port and the wired serial communication port.

3. The switch controlling device according to claim 1, wherein said switch is installed on a part of a computer to which a docking station is connected, wherein the docking station causes said switch to be mechanically positioned to automatically activate the light serial communication port when the docking system is mounted on the computer, and to automatically deactivate the light serial communication port when the docking system is removed from the computer.

4. The switch controlling device according to claim 1, wherein said light signal input/output part includes:

a power driving part for applying or cutting off power to said light signal input/output part according to the control signal inputted from said micro-controlling means;

a light signal output part for converting the control signal for controlling lines or a modem transmitted from the asynchronous communication part into a light signal and outputting the light signal when power is applied from said power driving part; and an asynchronous light signal input part for converting a light information signal containing information about the conditions of lines or a modem inputted from the external peripheral equipment into an electrical signal and transmitting the electrical signal to the asynchronous communication part.

5. The switching controlling device according to claim 4, wherein said power driving part includes:

a switch means which is turned on or turned off by a control signal of said micro-controlling means;

a transistor for outputting a voltage signal according to the operation of said switching means;

a capacitor which is charged by the voltage signal output from said transistor and which removes an alternating constituent contained in the voltage signal to produce a constant voltage signal.

6. A method for driving a switch controlling device of a wired serial communication port and a light serial communication port comprising the steps of:

providing a single asynchronous communication part;

reading a switch signal when power is applied to the switch controlling device;

determining from the read switch signal whether the light communication port is selected;

selecting as a transmit channel the wired serial communication port, by connecting said asynchronous communication part to said wired serial communication port and simultaneously cutting off power to the light communication port when the light serial communication port is not selected; and selecting as a transmit channel the light serial communication port, by connecting said asynchronous communication part to said light serial communication port and simultaneously applying power to the light serial communication port when the light serial communication port is selected.

* * * * *